United States Patent [19]

Wakayama et al.

[11] Patent Number: 4,500,360

[45] Date of Patent: Feb. 19, 1985

[54] SLIDING MEMBER MADE OF FIBER-REINFORCED METAL

[75] Inventors: Masao Wakayama, Nagoya; Makoto Takemura; Takao Kasagi, both of Okazaki, all of Japan

[73] Assignee: Nippon Soken, Inc., Nishio, Japan

[21] Appl. No.: 443,736

[22] Filed: Nov. 22, 1982

[30] Foreign Application Priority Data

Nov. 25, 1981 [JP] Japan ................................ 56-189474

[51] Int. Cl.[3] .......................... C09D 1/00; F01C 21/00

[52] U.S. Cl. ................................... 106/286.5; 418/152

[58] Field of Search ................ 106/286.5, 36; 428/152

[56] References Cited

U.S. PATENT DOCUMENTS 3,417,664 12/1968 Brucker ................................ 418/152
4,209,286 6/1980 Schwartz ............................ 418/152

FOREIGN PATENT DOCUMENTS 1581279 9/1969 France ................................ 418/152

OTHER PUBLICATIONS

Chem. Abst. 96: 185,927f, Sumitomo, Dec. 3, 81.
Chem. Abst: 91: 124,622c, Makino et al., May 9, 79.

*Primary Examiner*—Theodore Morris
*Attorney, Agent, or Firm*—Cushman, Darby & Cushman

[57] ABSTRACT

In a compressor having a sliding member such as a portion of a vane which is disposed to be slid on an opposite member made of iron base metal, the sliding member is made of carbon fiber-reinforced aluminum having a coefficient of thermal expansion of 0.9 to $1.6+10^{-5}/°$ C. in a temperature range from 0° C. to 250° C. and the carbon fiber-reinforced aluminum contains 15 to 40 volume % of carbon fiber which is irregularly distributed within an aluminum matrix without directional property.

1 Claim, 3 Drawing Figures

SLIDING MEMBER MADE OF FIBER-REINFORCED METAL

BACKGROUND OF THE INVENTION

The present invention relates to a sliding member formed of fiber-reinforced metal.

Conventionally, resin has been mainly used as the matrix of fiber reinforced material. However, the mechanical strength and heat resistance of the matrix of resi are insufficient. Therefore, the development of the fiber reinforced metal containing a metallic matrix has been required.

A sliding member which is in sliding contact with an opposite member, is required to have high mechanical strength and excellent heat resistance. And in the sliding member, the difference between the coefficient of thermal expansion of the sliding member and that of the opposite members, is a serious problem.

Hereinafter, vanes of a sliding vane compressor will be explained as one example of the sliding member. In the conventional compressor, a liner portion and a liner side portion defining a fluid chamber are made of iron-based material such as cast iron, and the vanes travelling within the fluid chamber while sliding on the liner portion and the liner side portion are made of an aluminum alloy such as aluminum-silicon alloy.

However, the aluminum alloy has a coefficient of thermal expansion larger than that of iron. When the compressor is driven at a high speed and high load, the vanes are heated to a high temperature so as to expand. As a result, the vanes are locked in the liner portion and the liner side portion. Therefore, the clearance between the vanes and the liner portion and that between the vanes and the liner side portion must be set large so as to prevent the vanes from being locked in the liner portion and the liner side portion. Consequently, the compression efficiency of the fluid is lowered.

Accordingly, one object of the present invention is to provide a sliding member formed of carbon fiber-reinforced metal of which the coefficient of thermal expansion is adjusted so as to be substantially equal to that of the opposite member.

DESCRIPTION OF THE DRAWINGS

Other objects and advantages of the invention will become apparent from the following description of embodiments thereof with reference to the accompanying drawings wherein.

SUMMARY OF THE INVENTION

It is well known that the mechanical strength and the friction characteristic of the carbon fiber reinforced metal are excellent because of the existance of carbon fiber.

And carbon fiber-reinforced aluminum is regarded as a fiber-reinforced metal having enough mechanical strength and heat resistance for the material of airplanes and automobiles.

Upon many experiments and studies on the carbon fiber-reinforced aluminum, the present inventors have confirmed that the coefficient of thermal expansion thereof can be freely selected by varying the carbon fiber content.

The present invention is made based on this confirmation.

The present invention provides a sliding member made of carbon fiber-reinforced aluminum of which carbon fiber content is 15 to 40%(volume %) and of which coefficient of thermal expansion is adjusted to $0.9\times10^{-5}$/°C. to $1.6\times10^{-5}$/°C. in the temperature range from 0° to 250° C.

The coefficient of thermal expansion of the carbon fiber-reinforced aluminum of the present invention is equal or substantially equal to that of iron($1.2\times10^{-5}$/°C.). Therefore, when the carbon fiber-reinforced aluminum of the present invention is applied to the vanes of the compressor, for example, the clearance between the vanes and the liner portion and the like can be kept minimum in any operating condition. As a result, excellent compression efficiency can be obtained.

Furthermore, the coefficient of friction of the carbon fiber-reinforced aluminum of the present invention is lower than that of other aluminum because of the existance of the carbon fiber so that the abrasion value can be reduced.

The carbon fiber reinforced aluminum of which coefficient of thermal expansion is adjusted according to the present invention, can be widely applied to various sliding members which are required to slide on another member made of iron-based material through a small clearance.

DETAILED DESCRIPTION OF INVENTION

Hereinafter, the present invention will be explained in accordance with the embodiments.

Carbon fiber of about 10μ in diameter and about 3 mm in length is opened, aluminum powder of 100 to 200 mesh is added to the opened carbon fibers and they are mixed with each other uniformly by an agitator.

Then, the obtained mixture is charged within a pressing die and is hot-pressed at a temperature of from 600° C. to 620° C. under a pressure of about 200 Kg/cm$^2$.

In the obtained fiber-reinforced aluminum, carbon fiber is irregularly distributed within an aluminum matrix.

Figure 1:
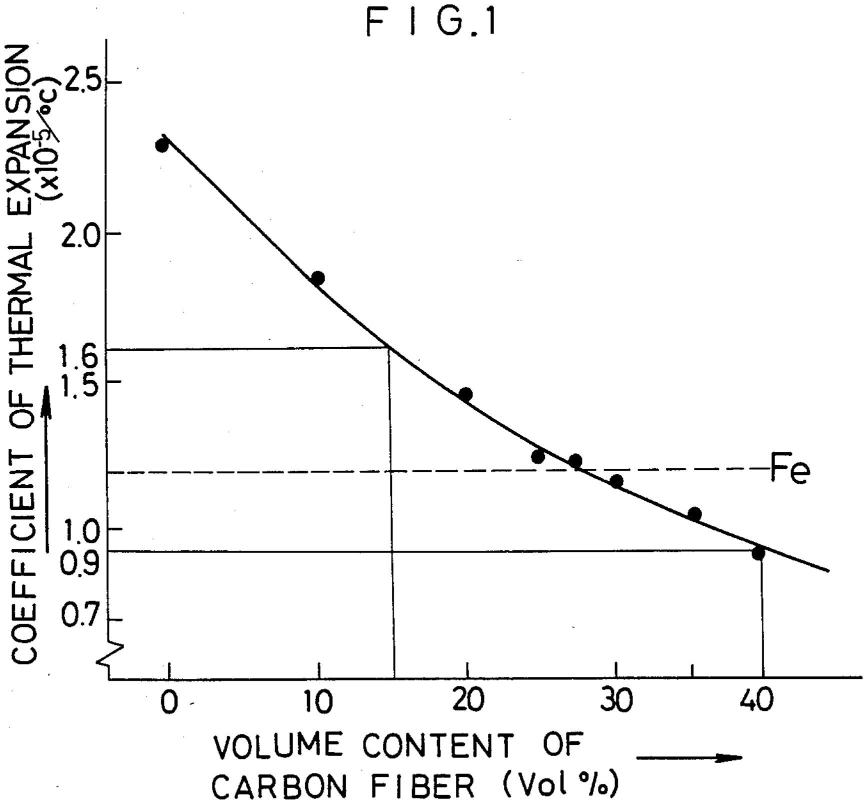
FIG. 1 is a graph showing the relation between the carbon fiber content and the coefficient of thermal expansion of the carbon fiber-reinforced aluminum.

FIG. 1 shows the relation between the volume content of carbon fiber and the coefficient of thermal expansion of the fiber-reinforced aluminum in the temperature range of 0° to 250° C.

As is apparent from FIG. 1, the coefficient of thermal expansion of the fiber-reinforced aluminum decreases as the content of carbon fiber increases. By adding 15 to 40 volume % of carbon fiber, the coefficient of thermal expansion can be made equal or substantially equal to that of iron, that is from 0.9 to $1.6\times10^{-5}$/°C.

Figure 2:
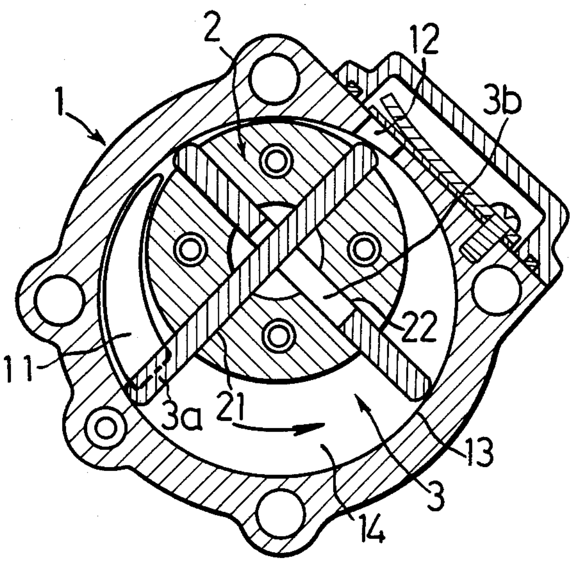
FIGS. 2 and 3 are sectional views of the compressors of which vanes are made of the sliding members of the present invention, respectively.
Figure 3:
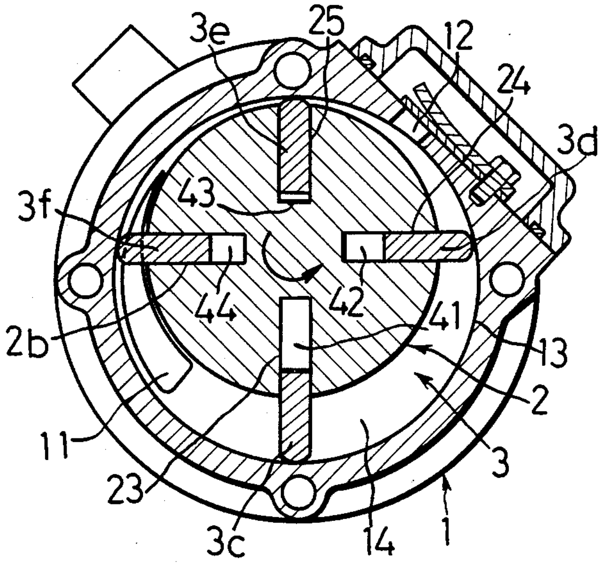

FIGS. 2 and 3 illustrate examples of the sliding member according to the present invention.

FIG. 2 illustrates a fluid compressor of the through vane type. Within a circular main body 1 made of cast iron, a rotor 2 made of cast iron is eccentrically disposed so as to rotate therewithin.

Between the main body 1 and the rotor 2, a fluid chamber 3 of which cross-sectional area is continuously varied, is formed. In the main body 1, a fluid inlet port 11 and a fluid outlet port 12 are formed so as to be opposed to both ends of the fluid chamber 3, of which cross-sectional area is the minimum, respectively.

In the rotor 2, guide grooves 21, 22 which intersect with each other at right angles are formed so as to extend therethrough in its radial direction.

Within the guide grooves 21, 22, through vanes 3a, 3b are slidably inserted. The through vanes 3a, 3b have substantially the same length as the diameter of a circular liner portion 13 defining the outer peripheral wall of the fluid chamber 3, and have substantially the same width as the distance between the opposed liner side portions 14 forming side walls of the fluid chamber 3.

When the rotor 2 rotates counterclockwise in FIG. 2, the vanes 3a, 3b also rotate counterclockwise while sliding in the radial direction of the rotor 2. The volume of the fluid chamber 3 defined by the vanes 3a, 3b increases after passing the inlet port 11. As a result, fluid is introduced from the inlet port 11 and after being compressed by the vanes 3a, 3b, the compressed fluid is discharged from the outlet port 12.

When the temperature of the compressor rises, the main body 1 expands so that the diameter of the liner portion 13 increases. And also, the distance between the liner side portion 14 is increased.

In order to increase the compression efficiency, the clearance between the vanes 3a, 3b and the liner portion 13 and that between the vanes 3a, 3b and the liner side portion 14 must be maintained at the minimum regardless of the temperature change.

By employing the vanes 3a, 3b made of fiber-reinforced aluminum having the same coefficient of thermal expansion as that of the main body 1, the change of the clearance between the vanes 3a, 3b and the liner portion 13 and that between the vanes 3a, 3b and the liner side portion 14 due to the temperature change can be maintained small, as compared with the conventional compressor.

Therefore, the clearance between the vanes 3a, 3b and the main body 1 can be made remarkably small when the compressor is designed.

As a result, as compared with the conventional compressor, improved compression efficiency can be obtained particularly when the temperature of the compressor is low.

The sliding member according to the present invention can be effectively applied to the vanes of the other vane type compressor as shown in FIG. 3.

In the rotor 2 of this compressor, bottomed grooves 23, 24, 25, 26 are formed in the radial direction thereof. Vanes 3c, 3d, 3e, 3f are slidably disposed within the grooves 23 to 26, respectively.

When the compressor is operated, compressed fluid in introduced from the fluid chamber 3 into spaces 41, 42, 43, 44 which are formed between the bottom of each vane and the the bottom of each groove, respectively.

By the pressure of the compressed fluid introduced into the spaces 41 to 44, the top end of each vane is pressed against the liner portion 13.

By employing the vanes formed according to the present invention, in a compressor of this type, the clearance between the vanes 3c to 3f and the liner side portion 14 can be maintained minimum.

Upon making experiments on a compressor of through vane type, the present inventors have obtained the following experimental result.

Namely, the volumetric efficiency of a compressor using carbon fiber-reinforced aluminum which contains 25 volume % of carbon fiber according to the present invention, was 80 to 85%. On the other hand, the volumetric efficiency of the conventional vanes made of aluminum-silicon alloy was 75 to 80%. And the abrasion volume observed when the compressor was driven at 6500 rpm and for 100 hours, was reduced to about one-third of that of the conventional vanes.

As described above, the present invention was made based on the fact that the carbon fiber-reinforced aluminum is superior to the aluminum alloy such as aluminum-silicon alloy in friction property and out experimental result that the coefficient of thermal expansion of carbon fiber-reinforced aluminum can be freely selected by changing the content of the carbon fiber thereof.

The carbon fiber-reinforced aluminum of the present invention, having a coefficient of thermal expansion which is adjusted into 0.9 to $1.6\times10^{-5}$/°C. by adding 15 to 40% of carbon fiber, can be effectively applied to a sliding member which is in sliding contact with an opposed member made of iron base material.

The sliding member of the present invention can be also applied to a bearing member which supports a rotating shaft.

Having now fully described the invention, it will be apparent to one of ordinary skill in the art that many changes and modifications can be made thereto without departing from the spirit or scope of the invention as set forth herein.

What is claimed is:

1. In a compressor having a vane of which a portion is disposed with a normally small clearance from another part of the compressor, made of iron-based metal, for potential sliding contact with such other part under some operating condition of the compressor, the improvement wherein:

said vane portion is made of carbon fiber-reinforced aluminum having a coefficient of thermal expansion of from 0.9 to $1.6\times10^{-5}$/°C. from 0° C. to 250° C.;

said carbon fiber-reinforced aluminum containing 15–40 percent, by volume, of carbon fiber, which is irregularly and isotropically distributed within a matrix of aluminum.

* * * * *